(12) United States Patent
Reial et al.

(10) Patent No.: US 7,852,902 B2
(45) Date of Patent: Dec. 14, 2010

(54) METHOD OF AND APPARATUS FOR MULTI-PATH SIGNAL COMPONENT COMBINING

(75) Inventors: Andres Reial, Lund (SE); Peter Malm, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1363 days.

(21) Appl. No.: 11/241,680

(22) Filed: Sep. 30, 2005

(65) Prior Publication Data
US 2007/0076785 A1  Apr. 5, 2007

(51) Int. Cl.
*H04B 1/00* (2006.01)
(52) U.S. Cl. .................. 375/130; 375/134; 375/136; 375/137; 375/147
(58) Field of Classification Search .............. 375/130, 375/134, 137, 136, 142, 143, 150, 152, 144
See application file for complete search history.

(56) References Cited

U.S. PATENT DOCUMENTS

| | | | |
|---|---|---|---|
| 6,363,104 B1 | 3/2002 | Bottomley | |
| 6,529,545 B2* | 3/2003 | Tiirola et al. ................ | 375/148 |
| 6,683,924 B1 | 1/2004 | Ottosson et al. | |
| 6,714,585 B1* | 3/2004 | Wang et al. ................. | 375/148 |
| 6,826,240 B1* | 11/2004 | Thomas et al. .............. | 375/340 |
| 7,397,842 B2* | 7/2008 | Bottomley et al. ......... | 375/148 |
| 7,397,843 B2* | 7/2008 | Grant et al. ................. | 375/148 |
| 7,415,061 B2* | 8/2008 | Currivan et al. ............ | 375/144 |
| 7,457,381 B1* | 11/2008 | Hosur et al. ................ | 375/347 |
| 7,590,167 B2* | 9/2009 | Fulghum et al. ............ | 375/148 |

(Continued)

FOREIGN PATENT DOCUMENTS

EP    1 179 891 A2    1/2004

(Continued)

OTHER PUBLICATIONS

Win, et al, "Performance of Rake Reception in Dense Multipath Channels: Implications of Spreading Bandwidth and Selection Diversity Order,", IEEE, vol. 18, No. 8, Aug. 2000, pp. 1516-1525.

(Continued)

*Primary Examiner*—David C Payne
*Assistant Examiner*—Linda Wong

(57) ABSTRACT

A method for use in receiving a spread-spectrum signal includes receiving an input signal. The input signal includes a first plurality of multipath components. The method also includes despreading the first plurality of multipath components. The step of despreading includes computing a plurality of corresponding delays. The method also includes computing a plurality of combining weights based, at least in part, on interference correlation between at least two of the first plurality of multipath components, selecting, according to at least one criterion, a subset of the plurality of combining weights, and despreading and combining a second plurality of multipath components using at least one quantity related to the selected plurality of combining weights and a plurality of delays and multipath components corresponding to the plurality of selected combining weights. This Abstract is provided to comply with rules requiring an Abstract that allows a searcher or other reader to quickly ascertain subject matter of the technical disclosure. This Abstract is submitted with the understanding that it will not be used to interpret or limit the scope or meaning of the claims.

44 Claims, 4 Drawing Sheets

U.S. PATENT DOCUMENTS

| | | | |
|---|---|---|---|
| 2003/0031236 A1* | 2/2003 | Dahlman et al. | 375/147 |
| 2004/0146094 A1 | 7/2004 | Kong et al. | |
| 2004/0219959 A1 | 11/2004 | Khayrallah et al. | |
| 2005/0069023 A1 | 3/2005 | Bottomley et al. | |
| 2005/0078742 A1* | 4/2005 | Cairns et al. | 375/148 |
| 2005/0123026 A1* | 6/2005 | Hasegawa et al. | 375/148 |
| 2005/0129137 A1* | 6/2005 | Yamada et al. | 375/267 |
| 2005/0195889 A1* | 9/2005 | Grant et al. | 375/148 |
| 2006/0182193 A1* | 8/2006 | Monsen | 375/267 |
| 2006/0188007 A1* | 8/2006 | Daneshrad et al. | 375/148 |
| 2006/0233222 A1* | 10/2006 | Reial et al. | 375/147 |
| 2006/0256843 A1* | 11/2006 | Grant et al. | 375/148 |
| 2006/0291543 A1* | 12/2006 | Fulghum et al. | 375/150 |
| 2007/0047628 A1* | 3/2007 | Fulghum et al. | 375/148 |
| 2008/0232438 A1* | 9/2008 | Dai et al. | 375/148 |
| 2009/0257477 A1* | 10/2009 | Khayrallah et al. | 375/148 |
| 2009/0304125 A1* | 12/2009 | Kim et al. | 375/341 |

FOREIGN PATENT DOCUMENTS

| | | |
|---|---|---|
| EP | 1 179 891 A3 | 1/2004 |
| WO | WO01/19113 A1 | 3/2001 |
| WO | WO02/052743 A2 | 7/2002 |
| WO | WO03/026145 A2 | 3/2003 |
| WO | WO2004/025859 A1 | 3/2004 |
| WO | WO2004/028018 A1 | 4/2004 |
| WO | WO2004/028020 A1 | 4/2004 |
| WO | WO2004/028021 A1 | 4/2004 |
| WO | WO2004/107597 A1 | 12/2004 |
| WO | WO2004/107600 A1 | 12/2004 |

OTHER PUBLICATIONS

Lenardi, et al, "Intercell Interference Cancellation at a WCDMA Mobile Terminal by Exploiting Excess Codes," Mobile Communications Department—Institut Eurecom.

Lenardi and Slock, "A RAKE Structured SINR Maximizing Mobile Receiver for the WCDMA Downlink," Institut Eurecom.

Irmer and Fettweis, "Combined Transmitter and Receiver Optimization for Multiple-Antenna Frequency-Selective Channels," 2002 IEEE, p. 412-416.

Chen et al, "Unified Performance Bounds for Generalized Selection Diversity Combining in Independent Generalized Fading Channels," Can. J. Elect. Comput. Eng., vol. 29, No. 1/2, Jan./Apr. 2004, pp. 1-8.

Cassioli et al, "Effects of Spreading Bandwidth on the Performance of UWB Rake Receivers," Mitsubishi Electric Research Laboratories, Inc., 2003.

Brunner, et al, "Exploiting the Short-Term and Long-Term Channel Properties in Space and Time: Eigenbeamforming Concepts for the BS in WCDMA," Institute for Circuit theory and Signal Processing, Munich University of Technology, Sep. 2002, pp. 1-14.

Brunner, et al, "Space-Time Eigenrake and Downlink Eigenbeamformer: Exploiting Long-Term and Short-Term Channel Properties in WCDMA," Munich Univ. of Technology.

Gaur and Annamalai, "Improving the Range of Ultrawideband Transmission using Rake Receivers," 2003 IEEE, pp. 597-601.

Bottomley et al, "A Generalized RAKE Receiver for Interference Suppression," 2000 IEEE, pp. 1536-1545.

* cited by examiner

METHOD OF AND APPARATUS FOR MULTI-PATH SIGNAL COMPONENT COMBINING

BACKGROUND

In wireless communications, a physical channel between a transmitter and a receiver is formed by a radio link. In most cases, a plurality of different propagation paths exist between the transmitter and the receiver due to reflections in the environment, giving rise to a multipath channel with several resolvable components. Performance of a Code Division Multiple Access (CDMA) receiver may be improved using signal energy carried by several multipath signal components. The performance improvement is traditionally achieved by using a RAKE receiver in which each multipath signal component is assigned a despreader whose reference copy of a spreading code is delayed equally to a path delay of a corresponding multipath signal component. Outputs of the despreaders (i.e., RAKE fingers) are then coherently combined to produce a symbol estimate.

The RAKE receiver requires knowledge of multipath delays and values of a channel impulse response for all paths; combining weights are formulated as complex conjugates of net channel estimates for each of the delays. A RAKE+ receiver aims to improve a combined signal-to-interference ratio (SIR) by additionally scaling each combining weight by an impairment signal (i.e., noise plus interference) variance for each delay. An active finger selection (AFS) stage may follow the weight computation in order to exclude delays that, with high probability, do not correspond to a physical path.

The RAKE receiver combines signals corresponding to different path positions based on an assumption that individual-finger impairment signals are uncorrelated. This assumption is appropriate in predominantly non-dispersive channels; however, in strongly-dispersive environments, simple RAKE combining becomes sub-optimal, since significant correlation may appear between the individual fingers. The correlation is typically due to both a smearing effect of a receiver filter, which affects an originally "white" part of the impairment signal, and the fact that the multipath channel creates several copies of the same interference signal (i.e., a "colored" part of the signal).

The correlation is a redundancy in the received signal that can be utilized to further suppress the impairment component of the signal. One efficient receiver type developed to achieve this suppression is a generalized RAKE (GRAKE) receiver, as described in U.S. Pat. Nos. 6,363,104 and 6,714,585, which are both incorporated herein by reference. In dispersive environments, where the colored component of the interference dominates, the GRAKE receiver may serve to increase a post-combining SIR by several dB on average.

The GRAKE receiver typically requires one or more additional probing fingers, which additional fingers are placed on the pilot channel, in order to find a good solution. One or more additional combining fingers are also often placed on the data channels as well in order to extract most of the available interference suppression gains. Since the added fingers imply an increase in needed resources compared to a conventional RAKE combining of the same channel, a practical advanced receiver incorporating GRAKE typically only applies the GRAKE combining to traffic channels adapted to the channel reception quality for the particular user (e.g., power-controlled dedicated physical channel (DPCH) and high-speed downlink shared channel (HS-DSCH) with user-reported-SIR-dependent transport format and modulation scheme) and where better reception yields immediate concrete gains (e.g., lower average transmit power under transmit power control (TPC) or higher throughput in HSDPA). Common channels are not typically adjusted per-user by the network. Rather, the common channels, such as the broadcast channel (BCH), forward access channel (FACH), paging channel (PCH), random access channel (RACH), common packet channel (CPCH), and downlink shared channel (DSCH) in WCDMA, are transmitted with sufficient power to be received over a whole cell with a typical prior art WCDMA receiver. To save resources in a GRAKE receiver, the common channels, and possibly some other channels, are received using simple RAKE combining that requires fewer despreaders. For purposes of this application, channels so received are referred to as non-GRAKE (NGR) channels.

In the GRAKE receiver, despread values produced by RAKE fingers are combined to generate a decision statistic. Interference components of the different RAKE fingers are modeled as colored Gaussian noise to account for multipath dispersion and pulse shaping. The use of orthogonal spreading codes is accounted for when computing noise correlation between the fingers and when determining the noise powers on the RAKE fingers. The noise properties are used in a maximum-likelihood approach to determine combining weights. Finger placement is based on maximizing the signal-to-noise ratio of the decision statistic.

In contrast, in conventional RAKE reception, finger placement and combining weights corresponding to the channel impulse response of the signal of interest are used. In conventional RAKE receivers, the finger delays equal the channel delays and the weights are the channel coefficients. However, in the GRAKE receiver, the number of fingers and the combining weights are design parameters. The GRAKE receiver has the same general structure as the conventional RAKE receiver, but with different delays and weights. Unlike conventional RAKE receivers, GRAKE receivers benefit from using more fingers than the number of multipath signal components.

SUMMARY OF THE INVENTION

A method for use in receiving a spread-spectrum signal includes receiving an input signal. The input signal includes a first plurality of multipath components. The method also includes despreading the first plurality of multipath components. The step of despreading includes computing a plurality of corresponding delays. The method also includes computing a plurality of combining weights based, at least in part, on interference correlation between at least two of the first plurality of multipath components, selecting, according to at least one criterion, a subset of the plurality of combining weights, and despreading and combining a second plurality of multipath components using at least one quantity related to the selected plurality of combining weights and a plurality of delays and multipath components corresponding to the plurality of selected combining weights.

An apparatus for use in receiving a spread-spectrum signal includes an antenna and a demodulator. The antenna is adapted to receive an input signal. The input signal includes a first plurality of multipath components. The demodulator is interoperably connected to the antenna. The demodulator includes a processor and a despreader and a combiner. The despreader is adapted to despread the first plurality of multipath components, by computing a plurality of corresponding delays based, at least in part, on interference correlation between at least two of the first plurality of multipath components. The processor is adapted to select, according to at least one criterion, a subset of the plurality of combining weights. The despreader and the combiner are interoperably connected to the processor and are adapted to despread and to combine a second plurality of multipath components, respectively, by using at least one quantity related to the selected plurality of combining weights and a plurality of delays and multipath components corresponding to the plurality of selected combining weights.

A method for use in receiving a spread-spectrum signal includes receiving an input signal, the input signal including a plurality of multipath signal components, determining delays corresponding to the plurality of multipath signal components, and computing a plurality of combining weights based, at least in part, on interference correlation between at least two of a plurality of multipath components. The plurality of multipath components include the plurality of multipath signal components. The method also includes selecting a subset of the plurality of combining weights. The selected subset of combining weights is a plurality of combining weights corresponding to the determined delays. The method also includes despreading and combining the plurality of multipath signal components using at least one quantity related to the selected plurality of combining weights and the plurality of determined delays.

An apparatus for use in receiving a spread-spectrum signal includes an antenna and a demodulator. The antenna is adapted to receive an input signal. The input signal comprises a plurality of multipath signal components. The demodulator is interoperably connected to the antenna. The demodulator includes a processor and a despreader and a combiner. The despreader is adapted to determine delays corresponding to the plurality of multipath signal components. The combiner is adapted to compute a plurality of combining weights based, at least in part, on interference correlation between at least one of a plurality of multipath components. The plurality of multipath components include the plurality of multipath signal components. The processor is adapted to select a subset of the plurality of combining weights. The selected subset of combining weights is a plurality of combining weights corresponding to the determined delays. The despreader and the combiner are adapted to despread and combine the plurality of multipath signal components, respectively, by using at least one quantity related to the selected plurality of combining weights and the plurality of determined delays.

An article of manufacture for use in receiving a spread-spectrum signal includes at least one computer-readable medium and processor instructions contained on the at least one computer-readable medium. The processor instructions are configured to be readable from the at least one computer-readable medium by at least one processor and thereby cause the at least one processor to operate as to receive an input signal. The input signal includes a plurality of multipath signal components. The processor instructions are also configured to cause the at least one processor to operate as to determine delays corresponding to the plurality of multipath signal components and compute a plurality of combining weights based, at least in part, on interference correlation between at least two of a plurality of multipath components. The plurality of multipath components include the plurality of multipath signal components. The processor instructions are also configured to cause the at least one processor to operate as to select a subset of the plurality of combining weights. The selected subset of combining weights is a plurality of combining weights corresponding to the determined delays. The processor instructions are also configured to cause the at least one processor to operate as to despread and to combine the plurality of multipath signal components using at least one quantity related to the selected plurality of combining weights and the plurality of determined delays.

An article of manufacture for use in receiving a spread-spectrum signal includes at least one computer-readable medium and processor instructions contained on the at least one computer-readable medium. The processor instructions are configured to be readable from the at least one computer-readable medium by at least one processor and thereby cause the at least one processor to operate as to receive an input signal. The input signal includes a first plurality of multipath components. The processor instructions are also configured to cause the at least one processor to operate as to despread the first plurality of multipath components by computing a plurality of corresponding delays. The processor instructions are also configured to cause the at least one processor to operate as to compute a plurality of combining weights based, at least in part, on interference correlation between at least two of the first plurality of multipath components. The processor instructions are also configured to cause the at least one processor to operate as to select, according to at least one criterion, a subset of the plurality of combining weights and despread and combine a second plurality of multipath components using at least one quantity related to the selected plurality of combining weights and a plurality of delays and multipath components corresponding to the plurality of selected combining weights.

The above summary of the present invention is not intended to represent each embodiment or every aspect of the present invention.

BRIEF DESCRIPTION OF THE DRAWINGS

A more complete understanding of the method and apparatus of embodiments of the present invention may be obtained by reference to the following Detailed Description when taken in conjunction with the accompanying Drawings wherein.

DETAILED DESCRIPTION OF ILLUSTRATIVE EMBODIMENTS OF THE INVENTION

Figure 1A:
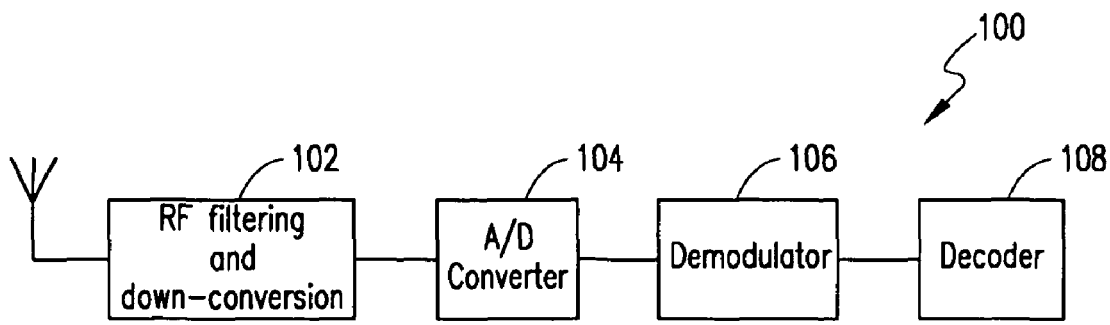
FIG. 1A is a block diagram of a receiver in accordance with the principles of the present invention.

Various particular channels are discussed herein for purposes of illustration; it should be understood that the discussion of particular channels is illustrative and that it is not intended that the invention be limited thereby. While the common-channel power levels are set so that they are supposed to be decodable over the entire cell regardless of fading, in practice situations often occur in which the common channels are decoded erroneously. The erroneous decoding causes loss of data and control information and can adversely affect both user experience and network resource usage. Overall user-equipment (UE) and network performance would be improved if robustness of the common-channel decoding, or that of any other non-GRAKE (NGR) channel, were improved, preferably without requiring an increase in receiver hardware resources. Moreover, it would be desirable to reduce the number of despreaders required to guarantee the mandated reception quality on the NGR-channels.

In various embodiments of the invention, a CDMA receiver incorporates a GRAKE receiver for handling some channels and a method of determining combining weights for NGR channels is employed. The combining weights for the NGR channels, which have fewer despreaders allocated to them, may be deduced from the GRAKE combining weights or weight-computation by-products or recomputed via computationally-simple procedures.

Various embodiments of the invention permit a GRAKE solution designed for a relatively-larger number of RAKE fingers to be usable in the RAKE configuration with relatively-fewer RAKE fingers available. The finger (i.e., despreader) positions need not necessarily be chosen as the path delays, but rather as a subset of the delays used by the GRAKE (available as a part of a GRAKE algorithm applied to some other channel(s)). The combining weights need not necessarily be computed "per finger" from the channel estimates and impairment power estimates; rather, the GRAKE weight solution or the by-products of the GRAKE weight computation process may be utilized to produce a set of weights that is close to optimal for the chosen subset of GRAKE delays. A particular NGR-channel weight formulation process may be chosen dynamically based on, for example, a Doppler estimate.

In a process of determining the combining weights for a timing unit n, GRAKE channels are combined using $N_g$ fingers per processed channel, while NGR channels are combined using $N_r$ fingers. The timing unit, n, is thus the timing interval with which the combining weights are updated and it is typically a slot in a WCDMA system, but other possible choices of n are a symbol period or a transmission time interval (TTI) in a WCDMA system. It is assumed that the list of physical path delay estimates $d_j$, $j=1, \ldots, N$ is known, where N is the number of multipath components of the wireless communication channel, and that access to some internal intermediate results from the GRAKE weight-computation process may be had. Values of interest include a list of $N_p$ probing finger delays $t_i$, $i=1, \ldots, N_p$, where some of the $t_i$ delays may be original path delays, some delays may correspond to positions with no physical paths, and a list of complex combining weights for all probing fingers $w_i$, $i=1, \ldots, N_p$ (i.e., $w_n$ in vector notation). $N_p$ is the number of probing fingers used in the GRAKE receiver. Typically, $N_p$ is larger than N. As by-products, a covariance matrix $R_n$ of impairment components of all probing fingers and medium-channel estimates $h_i$, $i=1, \ldots, N_p$ for all fingers (i.e., $h_n$, in vector notation) are also available. The weights and channel coefficients may also be expressed as column vectors, related as $w_n = R_n^{-1} \cdot h_n$.

In various embodiments of the invention, a full GRAKE weight solution for $N_p$ fingers is used to obtain an improved set of weights for the NGR channels, which utilize only $N_r$ fingers. A suitable subset of the GRAKE delays is chosen according to one or more criteria, and for that subset, the previously-computed GRAKE weights or some internal quantities from the GRAKE weight-computation process are used to determine the combining weights.

Several different illustrative methodologies consistent with principles of the invention are described below, but it should be noted that various other combinations of the methodologies below, as well as other methodologies, may be employed without departing from principles of the invention:

1. Using the instantaneously-strongest subset among any finger position by:
   a. computing the GRAKE weights $w_n$;
   b. choosing the $N_r$ largest weights, in a maximal absolute-value sense, from $w_n$, as well as their corresponding delays; and
   c. using the delays and weights directly for NGR-channel despreading and combining.

2. Using the recomputed weight solution for the instantaneously strongest finger positions by:
   a. computing the GRAKE weights $w_n$;
   b. determining the delays corresponding to the $N_r$ largest weights, in a maximal absolute-value sense, from $w_n$;
   c. forming $N_r \times N_r$ versions of the channel and covariance variables ($h_n^{NGR}$ and $R_n^{NGR}$) by pruning excluded rows and columns from $h_n$ and $R_n$;
   d. computing the NGR-channel weights as $w_n^{NGR} = (R_n^{NGR})^{-1} \cdot h_n^{NGR}$; and
   e. using the chosen delays and recomputed weights for NGR-channel despreading and combining.

3. Using the subset of instantaneously strongest path positions by:
   a. computing the GRAKE weights $w_n$;
   b. choosing the $N_r$ largest weights, in a maximal absolute-value sense, from $w_n$, as well as their corresponding delays, subject to the constraint that only true path positions $d_j$ are allowed as delays; and
   c. using the delays and weights directly for NGR-channel despreading and combining.

4. Using the recomputed weight solution for the instantaneously strongest path positions by:
   a. computing the GRAKE weights $w_n$;
   b. determining the delays corresponding to the $N_r$ largest weights, in a maximal absolute-value sense, from $w_n$, subject to the constraint that only the true path positions $d_j$ are allowed as delays;
   c. forming $N_r \times N_r$ versions of the channel and covariance variables ($h_n^{NGR}$ and $R_n^{NGR}$) by pruning excluded rows and columns from $h_n$ and $R_n$;
   d. computing the NGR-channel weights as $w_n^{NGR} = (R_n^{NGR})^{-1} \cdot h_n^{NGR}$; and
   e. using the chosen delays and recomputed weights for NGR-channel despreading and combining.

5. Using the standard RAKE positions by:
   a. determining the RAKE finger positions as done in a conventional RAKE receiver (optionally, including AFS);
   b. computing the GRAKE weights $w_n$;
   c. choosing the GRAKE weights corresponding to the RAKE delays from $w_n$; and
   d. using the RAKE delays and the corresponding GRAKE weights for NGR-channel despreading and combining.

6. Using the recomputed weight solution for the standard RAKE positions by:
   a. determining the RAKE finger positions as done in a conventional RAKE receiver (optionally, including AFS);
   b. computing GRAKE weights (in this example, only the by-products $h_n$ and $R_n$ are used);
   c. forming $N_r \times N_r$ versions of the channel and covariance variables ($H_n^{NGR}$ and $R_n^{NGR}$) by pruning excluded rows and columns from $h_n$ and $R_n$;
   d. computing the NGR-channel weights as $w_n^{NGR} = (R_n^{NGR})^{-1} \cdot h_n^{NGR}$; and
   e. using the RAKE delays and the newly-computed weights for NGR-channel despreading and combining.

In some cases, hardware design constraints may require that the delay positions for the NGR-channels be defined before the current-slot GRAKE weight solution has been completed. For example, NGR-channel despreading may need to start as soon as data samples are received for the current slot. The need to define the delay positions for the NGR channels before the current-slot GRAKE weight solution has been completed affects the processes that use the GRAKE solution to select the finger positions (e.g., examples 1-4 above). This dependency may be circumvented in various ways, such as, for example:

a) positions selected based on the GRAKE weights from slot n−1 (i.e., $w_{n-1}$) may be used to set up the despreaders for slot n (the weight values would still be determined using the latest (slot n) information); or b) a method that does not select the delay positions based on the GRAKE solution (e.g., examples 5-6 above) may be applied.

The choice of whether to apply approach a) or b) may be made dynamically, based, for example, on some operational or environmental parameter. For example, in the presence of a Doppler estimator, the receiver may choose to apply solution a) if vehicular speed is low or medium, and solution b) at high speeds. If internal delay and weight lists are not be available in a particular implementation, outwardly-visible GRAKE results (i.e., the final combined delay list $t_m^g$, m=1, ..., $N_g$ and weight list $w_m^g$, m=1, ..., $N_g$) may be used with at most a minor reduction in performance.

FIG. 1A is a block diagram of a receiver 100. The receiver 100 includes an antenna 101. Input signals received via the antenna 101 are provided to an RF filtering and down-conversion block 102. Filtered and down-converted data are provided to an analog-to-digital (A/D) converter block 104. From the A/D converter block 104, digital data are output to a demodulator 106. Following demodulation by the demodulator 106, the demodulator outputs demodulated data to a decoder 108. The receiver 100 may be included in a wireless communication device, such as, for example, a mobile telephone, pager, laptop computer, personal digital assistant, or the like.

Figure 1B:
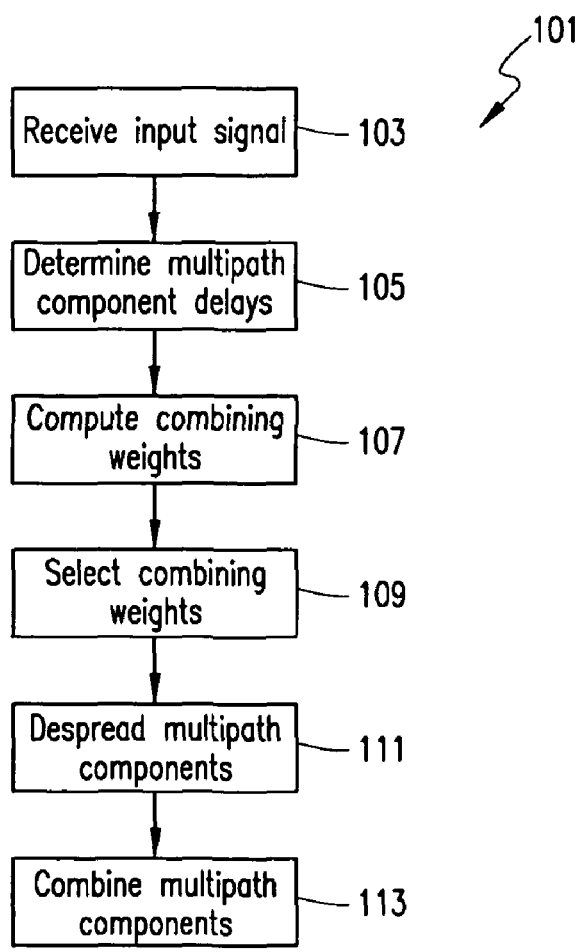
FIG. 1B is a flow chart illustrating a methodology in accordance with principles of the invention.

FIG. 1B is a flow chart illustrating a methodology consistent with principles of the invention. A methodology 101 begins at step 103. At step 103, an input signal is received. The input signal includes a plurality of multipath components. The plurality of multipath components may include, for example, all multipath components or only those multipath components corresponding to true path positions.

From step 103, execution proceeds to step 105. At step 105, delays corresponding to the plurality of multipath components are determined. From step 105, execution proceeds to step 107. At step 107, a plurality of combining weights are computed. The plurality of combining weights are computed, at least in part, on interference correlation between at least two of the plurality of multipath components.

From step 107, execution proceeds to step 109. At step 109, a subset of the plurality of combining weights is selected. The combining weights are selected according to at least one criterion. The selected subset of combining weights may be a plurality of combining weights corresponding to the delays determined at step 105.

From step 109, execution proceeds to step 111. At step 111, the plurality of multipath components are despread. From step 111, execution proceeds to step 113. At step 113, the plurality of multipath components are combined. The despreading of step 111 and the combining of step 113 are performed using at least one quantity related to the selected plurality of combining weights and the plurality of determined delays. In some embodiments of the invention, the despreading of step 111 and the combining of step 113 may be performed using, in addition to the at least one quantity, a plurality of delays and multipath components corresponding to the plurality of selected combining weights.

Figure 2:
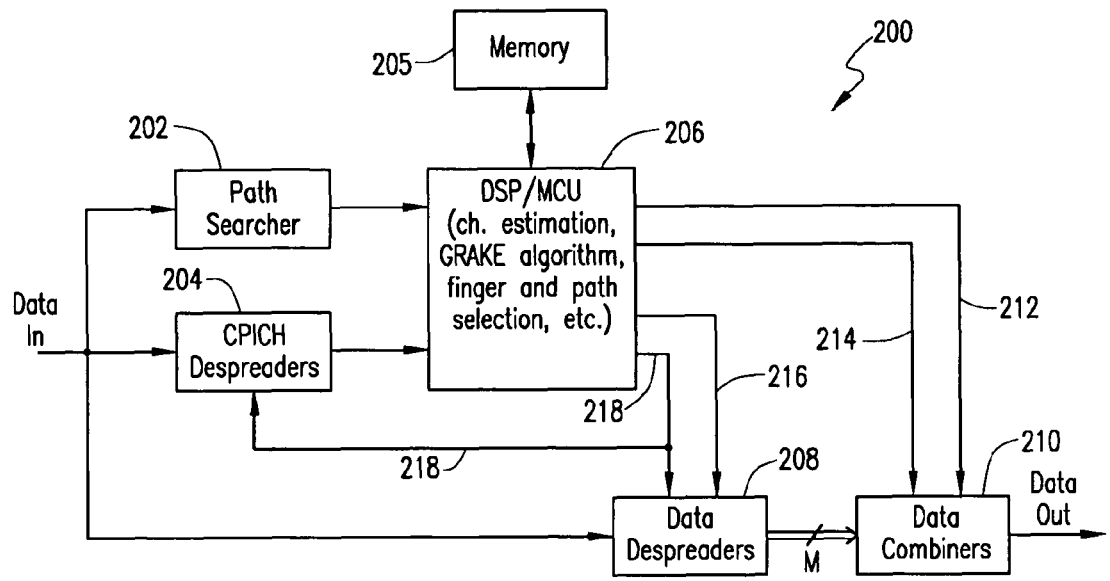
FIG. 2 is a block diagram of a demodulator in accordance with embodiments of the present invention.

FIG. 2 is a block diagram of a demodulator 200 in accordance with an embodiment of the invention. The demodulator 200 may be implemented, for example, in a receiver such as the receiver of 100, in which case the demodulator 200 would be implemented where the demodulator 106 is shown therein. In the demodulator 200, data in the form of chip samples are input to a path searcher block 202 and a plurality of common pilot channel (CPICH) despreaders 204. The data in are also provided to a data despreaders block 208. Each of the path searcher block 202 and the CPICH despreaders has an output interoperably connected to a processor block 206, which may be, for example, a digital signal processor or microcontrol unit (DSP/MCU) as shown in FIG. 2. In a typical embodiment, the DSP/MCU block performs channel estimation, GRAKE algorithm tasks, finger and path selection tasks, etc. The DSP/MCU block is interoperably connected to a memory 205.

The DSP/MCU unit 206 has outputs interoperably connected to a data despreaders block 208 and a data combiners block 210. The DSP/MCU block 206 outputs RAKE or non-GRAKE channel (NGR) weights 212 and GRAKE channel weights 214 to the data combiners block 210. In similar fashion, the DSP/MCU block 206 outputs NGR delays 216 and GRAKE delays 218 to the data despreaders block 208. As indicated in FIG. 2, the GRAKE delays 218 are also output by the DSP/MCU block 206 in feedback fashion to the CPICH despreaders block 204. It will be apparent to those having skill in the art that the various blocks of the demodulator 200 may take various forms and be implemented in numerous ways, such as using DSP or ASIC implementations, without departing from principles of the invention.

The data despreaders block 208 outputs M multipath components to the data combiners block 210, wherein M is an integer and may be, for example, in the range of 1-100. The data combiners block 210 outputs data in the form of combined symbols.

Figure 3:
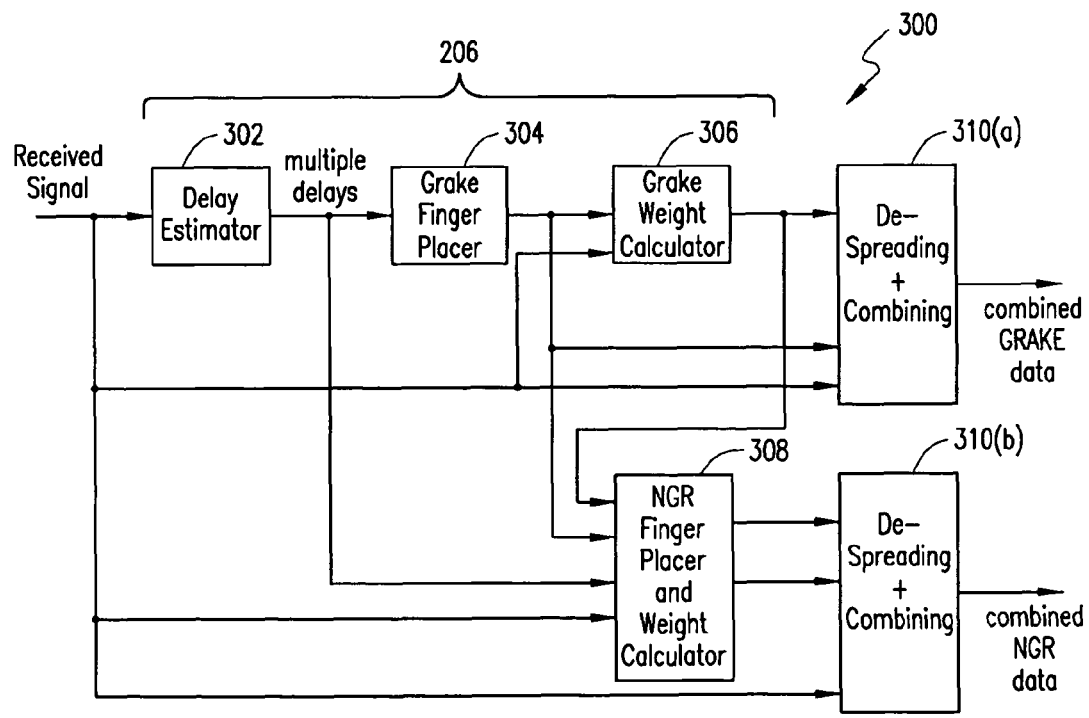
FIG. 3 is a block diagram of a receiver in accordance with embodiments of the invention.

FIG. 3 is a block diagram of a receiver in accordance with an embodiment of the invention. A receiver 300 receives signals that are provided to a delay estimator block 302, a GRAKE weight calculator block 306, a GRAKE finger placer 304, an NGR finger placer and weight calculator block 308, and despreading and combining blocks 310(a) and 310(b). The delay estimator 302 calculates multipath delays that are output to a GRAKE finger placer block 304. The multipath delays output by the delay estimator 302 are also provided to the NGR finger placer and weight calculator block 308.

An output of the GRAKE finger placer 304 is provided to the GRAKE weight calculator block 306, the despreading and combining block 310(a), and the NGR finger placer and weight calculator block 308. The NGR finger placer and weight calculator block 308 compute the NGR weights and NGR delays according to at least one of the methods discussed above. The NGR finger placer and weight calculator block 308 outputs NGR weights and NGR delays to the despreading and combining block 310(b).

The despreading and combining block 310(a) outputs combined GRAKE data. In similar fashion, the despreading and combining block 310(b) outputs combined NGR data. The despreading and combining block 310(a) and the despreading and combining block 310(b) may be identical or may differ as necessitated by design considerations. It is understood that the despreading and combining blocks 310

(a) and 310(b) may be partitioned in one hardware unit for the despreading parts and one unit for the combining parts or in a combined unit.

Figure 4:
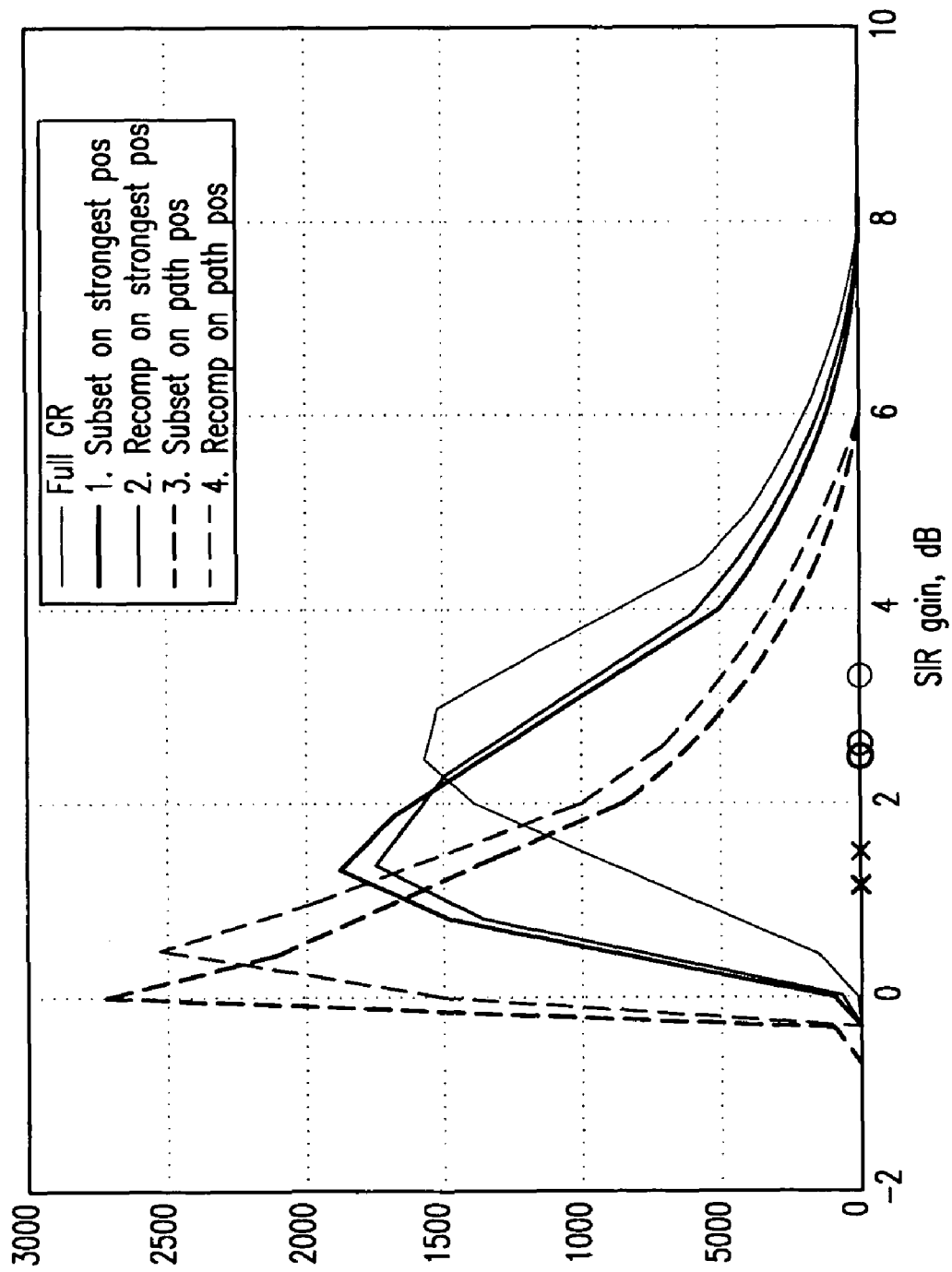
FIG. 4 is a graph illustrating a first exemplary simulation of a full GRAKE solution.
Figure 5:
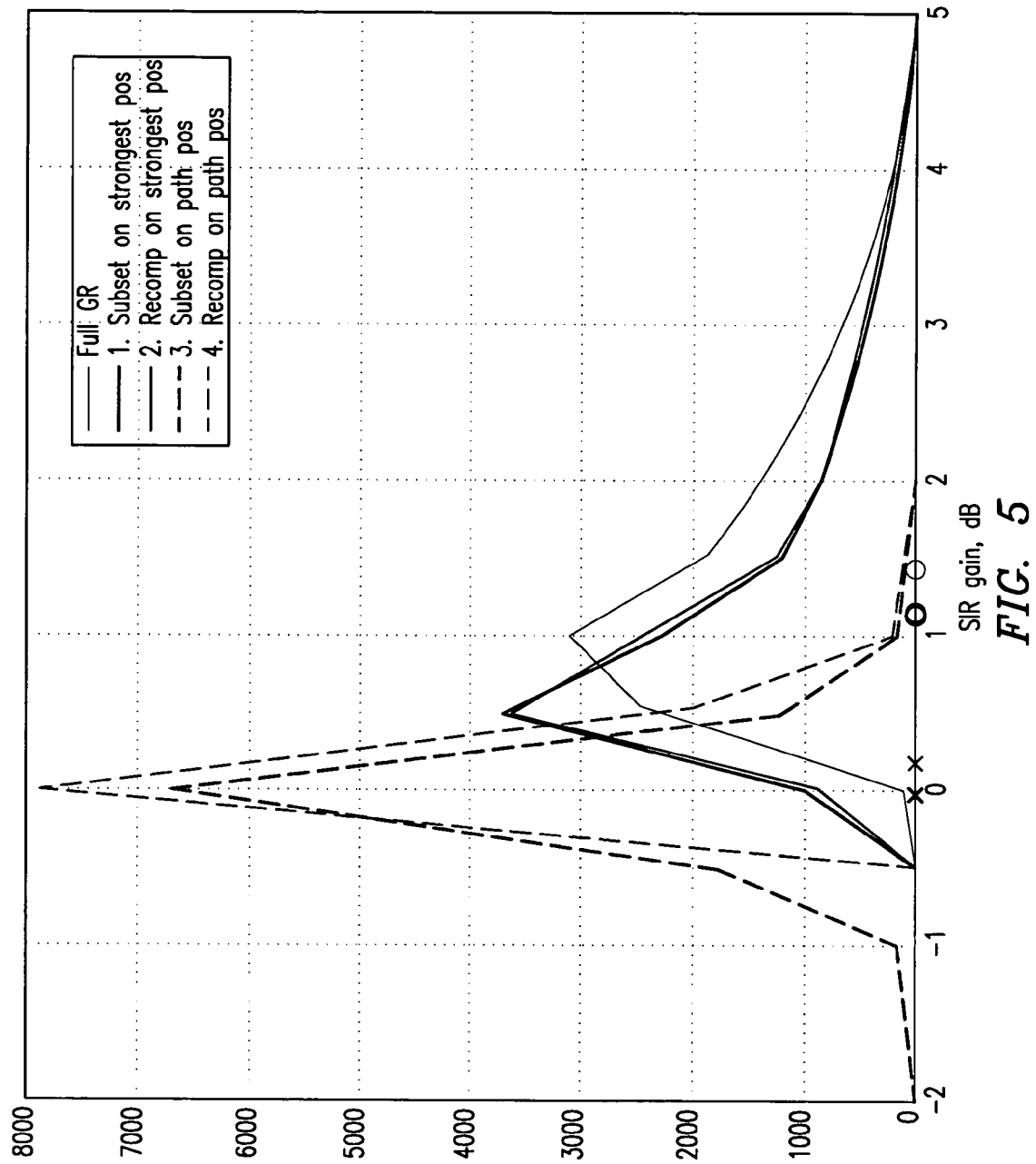
FIG. 5 is a graph illustrating a second exemplary simulation of a full GRAKE solution.

FIGS. 4 and 5 illustrate exemplary simulations of performance of the different weight formulations. FIG. 4 is a graph illustrating an exemplary simulation of a full GRAKE solution compared to each of the first four methodologies illustrated above in soft handover. FIG. 5 is a graph illustrating an exemplary simulation of a full GRAKE solution compared to each of the first four methodologies illustrated above in single-cell operation. SIR gain in dB, compared to RAKE+ combining with $N_r$ fingers, is shown in a form of a distribution (i.e., density). Exemplary cases are illustrated in which a full GRAKE receiver provides notable gains over a RAKE+receiver in the combined SIR. The NGR-channel weight solutions may serve to allow a significant fraction of the gains normally provided by GRAKE to be utilized for the NGR-channels as well, without requiring additional despreader/combiner resources beyond the regular RAKE allocation of $N_r$ fingers, and involving minimal additional weight-computation effort. The reception quality is thus improved. In another option, fewer RAKE fingers may be employed to process the NGR-channels while maintaining the original mandated reception quality.

Various embodiments of the invention may be applied during HSDPA reception in which only user data carried on the high-speed physical downlink shared channel (HS-PDSCH) is received with a GRAKE receiver. The high-speed shared control channel (HS-SCCH) and the associated DPCH are received using a RAKE+receiver in order to save processing time and/or minimize power consumption. In such cases, HS-SCCH latency requirements are quite strict according to 3GPP specifications; therefore, if a GRAKE receiver was used for the HS-SCCH, a higher clock frequency might be required in the receiver, which in turn would result in greater power consumption. Thus, various embodiments of the invention may be applied to an HSDPA scenario. When the GRAKE is already used for HS-PDSCH reception, the GRAKE results can be used to improve performance of the associated DPCH and the HS-SCCH as well, with a relatively-small complexity increase.

If a re-configured GRAKE solution is used for the NGR channels, the RAKE+weight computation and AFS stages may be removed from a receiver baseband processing suite. Various embodiments of the invention may be applied to any CDMA-based transmission system, both UL and DL. Moreover, although various embodiments of the invention have been discussed in the context of common channels, various embodiments of the invention may be applied to any channel.

Embodiments of the present invention may be implemented in, for example, hardware, software (e.g., carried out by a processor that executes computer-readable instructions), or a combination thereof. The computer-readable instructions may be program code loaded in a memory such as, for example, Random Access Memory (RAM), or from a storage medium such as, for example, Read Only Memory (ROM). For example, a processor may be operative to execute software adapted to perform a series of steps in accordance with principles of the present invention. The software may be adapted to reside upon a computer-readable medium such as, for example, a magnetic disc within a disc drive unit. The computer-readable medium may also include a flash memory card, EEROM based memory, bubble memory storage, ROM storage, etc. The software adapted to perform according to principles of the present invention may also reside, in whole or in part, in static or dynamic main memories or in firmware within a processor (e.g., within microcontroller, microprocessor, or a microcomputer internal memory).

It should be emphasized that the terms "comprise/comprises/comprising" when used in this specification are taken to specify the presence of stated features, integers, steps, or components, but do not preclude the presence or addition of one or more other features, integers, steps, or components, or groups thereof.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method for use in receiving a spread-spectrum signal, the method comprising:
   receiving an input signal, the input signal comprising a first plurality of multipath components;
   despreading the first plurality of multipath components, the step of despreading further comprising computing a first plurality of corresponding delays;
   computing a first plurality of combining weights based, at least in part, on interference correlation between at least two of the first plurality of multipath components;
   selecting, according to at least one criterion, a subset of the first plurality of combining weights and corresponding delays;
   computing a second plurality of combining weights based on a result from computing the first plurality of combining weights, wherein the result from computing the first plurality of combining weights is either the result used directly or a pruned result based on channel and covariance variables;
   despreading a second plurality of multi-path components using the subset of the first plurality of combining weights and corresponding delays; and
   combining a first data sequence using the despread first plurality of multipath components and the first plurality of combining weights, and combining a second data sequence using the despread second plurality of multi-path components and the second plurality of combining weights.

2. The method of claim 1, wherein the step of despreading a second plurality of multi-path components further comprises the steps of:
   using delays corresponding to the selected subset of the first combining weights;
   computing a second plurality of combining weights using at least one of the computed first plurality of combining weights; and
   combining the second plurality of despread multi-path components with the second plurality of combining weights.

3. The method of claim 2, wherein the plurality of combining weights are determined in accordance with a generalized RAKE (GRAKE) procedure.

4. The method of claim 2, wherein the first plurality of multipath components are received by a plurality of probing fingers.

5. The method of claim 4, wherein a plurality of the plurality of probing fingers are combining fingers.

6. The method of claim 2, wherein the despreading and combining steps are performed in accordance with a RAKE procedure.

7. The method of claim 2, wherein a number of the first plurality of multipath components exceeds a number of the second plurality of multipath components.

8. The method of claim 2, wherein:
the first plurality of multipath components comprises at least one interference component; and
the second plurality of multipath components consists of a plurality of multipath signal components.

9. The method of claim 2, wherein:
the selecting step comprises selecting the k largest combining weights in an absolute-value sense; and
k equals the number of the second plurality of multipath components.

10. The method of claim 2, wherein:
the selecting step comprises selecting the k largest combining weights in an absolute-value sense that correspond to multipath signal components of the first plurality of multipath components; and
k equals the number of the second plurality of multipath components.

11. The method of claim 2, wherein:
the plurality of delays corresponding to the plurality of selected combining weights are determined from a first timing unit; and
the at least one quantity related to the selected plurality of combining weights is computed from a timing unit subsequent to the first timing unit.

12. The method of claim 11, wherein the timing unit is a WCDMA slot.

13. A method for use in receiving a spread-spectrum signal, the method comprising:
receiving an input signal, the input signal comprising a first plurality of multi-path components;
despreading the first plurality of multi-path components, the step of despreading comprising computing a first plurality of corresponding delays;
computing a plurality of combining weights based, at least in part, on interference correlation between at least two of the first plurality of multi-path components;
selecting, according to at least one criterion, a subset of the first plurality of combining weights and corresponding delays;
computing a second plurality of combining weights based on a result from computing the first plurality of combining weights;
despreading a second plurality of multi-path components using the subset of the first plurality of corresponding delays;
wherein the selecting step comprises:
forming size-m versions of a channel variable $h_n^{NGR}$ a size-mxm covariance variable $R_n^{NGR}$, the step of forming comprising pruning excluded rows and columns from each of $h_n^{NGR}$ and $R_n^{NGR}$;
wherein m equals the number of the second plurality of multipath components;
wherein n designates a timing unit; and
computing a plurality of recomputed combining weights $w_n^{NGR}=(R_n^{NGR})^{-1}h_n^{NGR}$; and
combining a first data sequence using the despread first plurality of multipath components and the first plurality of combining weights, and combining a second data sequence using the despread second plurality of multipath components and the second plurality of combining weights.

14. The method of claim 13, wherein the at least one quantity related to the selected plurality of combining weights is the plurality of recomputed combining weights.

15. The method of claim 13, wherein the timing unit is a WCDMA slot.

16. A method for use in receiving a spread-spectrum signal, the method comprising:
receiving an input signal, the input signal comprising a first plurality of multi-path components;
despreading the first plurality of multi-path components, the step of despreading comprising computing a first plurality of corresponding delays;
computing a first plurality of combining weights based, at least in part, on interference correlation between at least two of the first plurality of multi-path components;
selecting, according to at least one criterion, a subset of the first plurality of combining weights and corresponding delays;
computing a second plurality of combining weights based on a result from computing the first plurality of combining weights, wherein the result from computing the first plurality of combining weights is either a final result or intermediate result based on channel and covariance estimates; and
despreading and combining a second plurality of multipath components using;
the subset of the first plurality of corresponding delays;
wherein the selecting step further comprises:
selecting the k largest combining weights in an absolute-value sense that correspond to multi-path signal components of the first plurality of multi-path components and k equals the number of the second plurality of multi-path components;
forming size-m versions of a channel variable $h_n^{NGR}$ and a size-mxm covariance variable $R_n^{NGR}$, the step of forming comprising pruning excluded rows and columns from each of $h_n^{NGR}$ and $R_n^{NGR}$;
wherein m equals the number of the second plurality of multipath components;
wherein n designates a timing unit; and
computing a plurality of recomputed combining weights
computing a plurality of recomputed combining weights $w_n^{NGR}=(R_n^{NGR})^{-1}h_n^{NGR}$; and
combining a first data sequence using the despread first plurality of multipath components and the first plurality of combining weights, and combining a second data sequence using the despread second plurality of multipath components and the second plurality of combining weights.

17. The method of claim 16, wherein the at least one quantity related to the selected plurality of combining weights is the plurality of recomputed combining weights.

18. The method of claim 16, wherein the timing unit is a WCDMA slot.

19. A method for use in receiving a spread-spectrum signal, the method comprising:
receiving an input signal, the input signal comprising a plurality of multipath signal components;
determining a first plurality of delays corresponding to a first plurality of multipath signal components;
computing a first plurality of combining weights based, at least in part, on interference correlation between at least two of the first plurality of multipath components;
wherein the first plurality of multipath components comprise the plurality of multipath signal components;
selecting a subset of the first plurality of combining weights;
wherein the selected subset of the first plurality of combining weights corresponds to the first plurality of delays; and computing a second plurality of combining weights based on a result from computing the first plurality of combining weights, wherein the result from computing the first plurality of combining weights is either the result used directly or a pruned result based on channel and covariance estimates; and despreading a second plurality of multi-path components with the subset of the first plurality of corresponding delays; and combining a first data sequence using the despread first plurality of multipath components and the first plurality of combining weights, and combining a second data sequence using the despread second plurality of multi-path components and the second plurality of combining weights.

20. A method for use in receiving a spread-spectrum signal, the method comprising:

receiving an input signal, the input signal comprising a plurality of multi-path signal components;

despreading the first plurality of multipath components, the step of despreading further comprising computing a first plurality of corresponding delays;

computing a first plurality of combining weights based, at least in part, on interference correlation between at least two of a plurality of multi-path components;

wherein the first plurality of multi-path components comprise the plurality of multi-path signal components;

selecting a subset of the first plurality of combining weights and corresponding delays;

computing a second plurality of combining weights based on a result from computing the first plurality of combining weights;

despreading a second plurality of multi-path components the subset of the first plurality of corresponding delays;

wherein the selecting step further comprises:

forming size-m versions of a channel variable $h_n^{NGR}$ and a size-mxm covariance variable $R_n^{NGR}$, the step of forming comprising pruning excluded rows and columns from each of $h_n^{NGR}$ and $R_n^{NGR}$ wherein m equals the number of the second plurality of multipath components;

wherein n designates a timing unit; and computing a plurality of recomputed combining weights $w_n^{NGR} = (R_n^{NGR})^{-1} h_n^{NGR}$; and combining a first data sequence using the despread first plurality of multipath components and the first plurality of combining weights, and combining a second data sequence using the despread second plurality of multi-path components and the second plurality of combining weights.

21. The method of claim 20, wherein:

the at least one quantity related to the selected plurality of combining weights is the plurality of recomputed combining weights; and the timing unit is a WCDMA slot.

22. An apparatus for use in receiving a spread-spectrum signal, the apparatus comprising:

an antenna adapted to receive an input signal, the input signal comprising a first plurality of multipath components;

a demodulator, interoperably connected to the antenna, the demodulator comprising:

a despreader adapted to despread the first plurality of multipath components, the despreading comprising computing a first plurality of corresponding delays;

a combiner adapted to compute a first plurality of combining weights based, at least in part, on interference correlation between at least two of the first plurality of multipath components;

a processor adapted to select, according to at least one criterion, a subset of the first plurality of combining weights and corresponding delays;

the combiner further adapted to compute a second plurality of combining weights based on a result from computing the first plurality of combining weights, wherein the computation from the first plurality of combining weights is either the result used directly or a pruned result based on channel and covariance estimates;

the despreader is further adapted to despread a second plurality of multi-path components using the subset of the first plurality of corresponding delays; and the demodulator adapted to combine a first data sequence using the despread first plurality of multipath components and the first plurality of combining weights, and combine a second data sequence using the despread second plurality of multiple components and the second plurality of combining weights.

23. The apparatus of claim 22, wherein the despreader is further adapted to:

despread a second plurality of multi-path components;

use delays corresponding to the selected subset of the first combining weights;

compute a second plurality of combining weights using at least one of the computed first plurality of combining weights; and combine the second plurality of despread multi-path components with the second plurality of combining weights.

24. The apparatus of claim 23, wherein the processor is included in a generalized RAKE (GRAKE) receiver.

25. The apparatus of claim 23, wherein the apparatus further comprises a plurality of probing fingers adapted to receive the first plurality of multipath components.

26. The apparatus of claim 25, wherein a plurality of the plurality of probing fingers are combining fingers.

27. The apparatus of claim 23, wherein the despreader and the combiner are included in a RAKE receiver.

28. The apparatus of claim 23, wherein a number of the first plurality of multipath components exceeds a number of the second plurality of multipath components.

29. The apparatus of claim 23, wherein:

the first plurality of multipath components comprises at least one interference component; and the second plurality of multipath components consists of a plurality of multipath signal components.

30. The apparatus of claim 23, wherein:

the processor is adapted to select the k largest combining weights in an absolute value sense; and k equals the number of the second plurality of multipath components.

31. The apparatus of claim 30, wherein the at least one quantity related to the selected plurality of combining weights is the selected plurality of combining weights.

32. The apparatus of claim 23, wherein:

the processor is adapted to select the k largest combining weights in an absolute-value sense that correspond to multipath signal components of the first plurality of multipath components; and k equals the number of the second plurality of multipath components.

33. The apparatus of claim 23, wherein the processor is adapted to:
 determine the plurality of delays corresponding to the plurality of selected combining weights from a first timing unit; and
 compute the at least one quantity related to the selected plurality of combining weights from a timing unit subsequent to the first timing unit.

34. The apparatus of claim 33, wherein the timing unit is a WCDMA slot.

35. An apparatus for use in receiving a spread-spectrum signal, the apparatus comprising:
 an antenna adapted to receive an input signal, the input signal comprising a first plurality of multi-path components;
 a demodulator, interoperably connected to the antenna, the demodulator comprising:
 a despreader adapted to despread the first plurality of multi-path components, the despreading comprising computing a first plurality of corresponding delays;
 a combiner adapted to compute a plurality of combining weights based, at least in part, on interference correlation between at least two of the first plurality of multi-path components;
 a processor adapted to select, according to at least one criterion, a subset of the first plurality of combining weights and corresponding delays;
 the combiner further adapted to compute a second plurality of combining weights based on a result from computing the first plurality of combining weights;
 the despreader is further adapted to despread a second plurality of multi-path components using the subset of the first plurality of corresponding delays;
 wherein the processor is adapted to:
 form size-m versions of a channel variable $h_n^{NGR}$ and a size-mxm covariance variable $R_n^{NGR}$, by pruning excluded rows and columns from each of $h_n^{NGR}$ and $R_n^{NGR}$;
 wherein m equals the number of the second plurality of multipath components;
 wherein n designates a timing unit; and compute a plurality of recomputed combining weights $w_n^{NGR}=(R_n^{NGR})^{-1}h_n^{NGR}$, and
 the demodulator adapted to combine a first data sequence using the despread first plurality of multipath components and the first plurality of combining weights, and combine a second data sequence using the despread second plurality of multipath components and the second plurality of combining weights.

36. The apparatus of claim 35, wherein the timing unit is a WCDMA slot.

37. An apparatus for use in receiving a spread-spectrum signal, the apparatus comprising:
 an antenna adapted to receive an input signal, the input signal comprising a first plurality of multi-path components;
 a demodulator, interoperably connected to the antenna, the demodulator comprising:
 a despreader adapted to despread the first plurality of multi-path components, the despreading comprising computing a first plurality of corresponding delays;
 a combiner adapted to compute a plurality of combining weights based, at least in part, on interference correlation between at least two of the first plurality of multi-path components;
 a processor adapted to select, according to at least one criterion, a subset of the first plurality of combining weights and corresponding delays;
 the combiner further adapted to compute a second plurality of combining weights based on a result from computing the first plurality of combining weights;
 the despreader is further adapted to despread a second plurality of multi-path components using the subset of the first plurality of corresponding delays;
 wherein the processor is adapted to:
 select the k largest combining weights in an absolute-value sense that correspond to multi-path signal components of the first plurality of multi-path components; and
 k equals the number of the second plurality of multi-path components;
 form size-m versions of a channel variable $h_n^{NGR}$ and a size-mxm covariance variable $R_n^{NGR}$ and being adapted to prune excluded rows and columns from each of $h_n^{NGR}$ and $R_n^{NGR}$
 wherein m equals the number of the second plurality of multipath components;
 wherein n designates a timing unit; and
 computing a plurality of recomputed combining weights $w_n^{NGR}=(R_n^{NGR})^{-1}h_n^{NGR}$; and
 the demodulator adapted to combine a first data sequence using the despread first plurality of multipath components and the first plurality of combining weights, and combine a second data sequence using the despread second plurality of multipath components and the second plurality of combining weights.

38. The apparatus of claim 37, wherein the at least one quantity related to the selected plurality of combining weights is the plurality of recomputed combining weights.

39. An apparatus for use in receiving a spread-spectrum signal, the apparatus comprising:
 an antenna adapted to receive an input signal, the input signal comprising a plurality of multipath signal components;
 a demodulator, interoperably connected to the antenna, the demodulator comprising:
 a processor adapted to:
 determine a first plurality of delays corresponding to the plurality of multipath signal components;
 compute a first plurality of combining weights based, at least in part, on interference correlation between at least two of a first plurality of multipath components wherein the first plurality of multipath components comprise the plurality of multipath signal components
 select a subset of the first plurality of combining weights;
 a despreader adapted to despread the first plurality of multi-path components, the despreader adapted to compute a first plurality of corresponding delays;
 a combiner adapted to compute a plurality of combining weights based, at least in part, on interference correlation between at least two of the first plurality of multi-path components;
 the processor further adapted to select, according to at least one criterion, a subset of the first plurality of combining weights and corresponding delays;
 the combiner further adapted to compute a second plurality of combining weights based on a result from computing the first plurality of combining weights, wherein the result is a final result or a pruned result based on channel and covariance variables;
 the despreader further adapted to despread a second plurality of multi-path components using the subset of the first plurality of corresponding delays; and the demodulator adapted to combine a first data sequence using the despread first plurality of multipath components and the first plurality of combining weights, and combine a second data sequence using the despread second plurality of multipath components and the second plurality of combining weights.

40. The apparatus of claim 39, wherein the at least one quantity related to the selected plurality of combining weights is the plurality of selected combining weights.

41. The apparatus of claim 32, wherein the timing unit is a WCDMA slot.

42. An apparatus for use in receiving a spread-spectrum signal, the apparatus comprising:
an antenna adapted to receive an input signal, the input signal comprising a plurality of multi-path signal components;
a demodulator, interoperably connected to the antenna, the demodulator comprising:
a processor adapted to:
determine a first plurality of delays corresponding to the plurality of multi-path signal components;
compute a first plurality of combining weights based, at least in part, on interference correlation between at least two of a first plurality of multipath components wherein the first plurality of multipath components comprise the plurality of multipath signal components;
select a subset of the first plurality of combining weights;
a despreader adapted to despread the first plurality of multi-path components, the despreader adapted to compute a first plurality of corresponding delays;
a combiner adapted to compute a plurality of combining weights based, at least in part, on interference correlation between at least two of the first plurality of multi-path components;
the processor further adapted to select, according to at least one criterion, a subset of the first plurality of combining weights and corresponding delays;
the combiner further adapted to compute a second plurality of combining weights based on a result from computing the first plurality of combining weights;
the despreader further adapted to despread a second plurality of multi-path components using the subset of the first plurality of corresponding delays;
wherein the processor is adapted to:
form size-m versions of a channel variable $h_n^{NGR}$ a size-toxin covariance variable $R_n^{NGR}$ by being adapted to prune excluded rows and columns from each of $h_n^{NGR}$ and $R_n^{NGR}$;
wherein m equals the number of the second plurality of multipath components;
wherein n designates a timing unit; and
computing a plurality of recomputed combining weights $w_n^{NGR} = (R_n^{NGR})^{-1} h_n^{NGR}$ and the demodulator adapted to combine a first data sequence using the despread first plurality of multipath components and the first plurality of combining weights, and combine a second data sequence using the despread second plurality of multipath components and the second plurality of combining weights.

43. The apparatus of claim 42, wherein:
the at least one quantity related to the selected plurality of combining weights is the plurality of recomputed combining weights; and
the timing unit is a WCDMA slot.

44. An article of manufacture for use in receiving a spread-spectrum signal, the article of manufacture comprising:
at least one computer readable medium;
processor instructions contained on the at least one computer readable medium, the processor instructions configured to be readable from the at least one computer readable medium by at least one processor and thereby cause the at least one processor to:
determine a first plurality of delays corresponding to the plurality of multi-path signal components;
compute a first plurality of combining weights based, at least in part, on interference correlation between at least two of a first plurality of multipath components wherein the first plurality of multipath components comprise the plurality of multipath signal components;
select a subset of the first plurality of combining weights;
despread the first plurality of multi-path components, to compute a first plurality of corresponding delays;
compute a plurality of combining weights based, at least in part, on interference correlation between at least two of the first plurality of multi-path components;
select, according to at least one criterion, a subset of the first plurality of combining weights and corresponding delays;
compute a second plurality of combining weights based on a result from computing the first plurality of combining weights, wherein the result is a final result or a pruned result based on channel and covariance variables;
despread a second plurality of multi-path components using the subset of the first plurality of corresponding delays; and
combine a first data sequence using the despread first plurality of multipath components and the first plurality of combining weights, and combine a second data sequence using the despread second plurality of multi-path components and the second plurality of combining weights.

* * * * *

UNITED STATES PATENT AND TRADEMARK OFFICE
CERTIFICATE OF CORRECTION

PATENT NO. : 7,852,902 B2
APPLICATION NO. : 11/241680
DATED : December 14, 2010
INVENTOR(S) : Reial et al.

It is certified that error appears in the above-identified patent and that said Letters Patent is hereby corrected as shown below:

On the Title Page, Item (54), in Title, & in Column 1, Line 2,
delete "SIGNAL COMPONENT" and insert -- SIGNAL-COMPONENT --, therefor.

In Column 1, Line 2, delete "SIGNAL COMPONENT" and
insert -- SIGNAL-COMPONENT --, therefor.

In Column 6, Line 16, delete "$h_m$," and insert -- $h_n$ --, therefor.

In Column 6, Line 60, delete "$h_m$," and insert -- $h_n$ --, therefor.

In Column 6, Line 62, delete "($H_n^{NGR}$" and insert -- ($h_n^{NGR}$ --, therefor.

In Column 11, Line 50, in Claim 13, after "$h_n^{NGR}$", insert -- and --, therefor.

In Column 13, Line 40, in Claim 20, delete "$R_n^{NGR}$" and insert -- $R_n^{NGR}$; --, therefor.

In Column 14, Line 22, in Claim 22, delete "multiple" and insert -- multipath --, therefor.

In Column 15, Line 44, in Claim 35, delete ", and" and insert -- ; and --, therefor.

In Column 16, Line 19, in Claim 37, delete "$R_n^{NGR}$" and insert -- $R_n^{NGR}$; --, therefor.

In Column 16, Line 48, in Claim 39, delete "components" and
insert -- components; --, therefor.

In Column 17, Line 45, in Claim 42, after "$h_n^{NGR}$", insert -- and --.

In Column 18, Line 2, in Claim 42, delete "$h_n^{NGR}$ and" and
insert -- $h_n^{NGR}$; and --, therefor.

Signed and Sealed this
Eleventh Day of October, 2011

David J. Kappos
*Director of the United States Patent and Trademark Office*

In Column 18, Lines 2-8, in Claim 42, delete "the................weights." and insert the same at Line 3, as a new paragraph.